United States Patent Office 3,525,697
Patented Aug. 25, 1970

3,525,697
DISPERSIBLE RUBBER ACCELERATORS AND STABILIZERS
Eric Rogers, Wrexham, Wales, assignor to Monsanto Chemical Limited, London, England, a British company
No Drawing. Filed Apr. 17, 1967, Ser. No. 631,176
Claims priority, application Great Britain, Apr. 19, 1966, 12,088/66
Int. Cl. C09k 3/00
U.S. Cl. 252—182        15 Claims

ABSTRACT OF THE DISCLOSURE

A zinc salt of a dithiocarbamic acid or of a mercaptobenzothiazole is mingled by spraying and mixing or by other blending means with an amine salt of a sulfated fatty acid ester to produce water-dispersible compositions. Optional ingredients are finely divided, absorbent, water-insoluble solid as anti-caking agent, alkyl sulfate wetting agent, and suspension-stabilizing agent, which may be bentonite or a water-soluble polyelectrolyte.

---

This invention relates to compositions containing rubber chemicals, in particular to compositions containing certain zinc salts that are useful as rubber stabilizers or accelerators.

Such zinc salts, for example the zinc N,N-dialkyldithiocarbamates and zinc mercaptobenzothiazole, are water-insoluble materials and are used in the rubber industry in the form of fine powders. There are occasions when it is required to add one of these zinc salts to an aqueous system, for example a rubber latex or an aqueous suspension of the rubber particles, but it is extremely difficult to obtain a uniform dispersion of the normal form of powder.

The British patent specification No. 30,305/64 describes compositions in which such zinc salts are formulated to give powders that are readily and uniformly dispersed in aqueous systems, including compositions containing an alkali metal (or ammonium) salt of a sulfated fatty acid ester.

I have now found that the use of amine salts of sulfated fatty acid esters represents an improvement over the use of the alkali metal salts of such esters proposed in the above-mentioned specification.

A composition of the present invention is accordingly one comprising a zinc salt of a dithiocarbamic acid or of a mercaptobenzothiazole and an amine salt of a sulfated fatty acid ester.

Preferred amine salts are the alkanolamine salts such as, for instance, the diethanolamine salt of sulfated butyl oleate.

Preferably, a finely-divided, water-insoluble, absorbent solid, which functions to prevent caking, is also present in the composition. Finely-divided calcium and magnesium silicates have been found to be particularly suitable for this purpose.

A composition of the invention can, with advantage, also contain a suspension stabilizing agent, that is to say a material having the effect of reducing the sedimentation rate of an aqueous suspension of the composition. Bentonite clay is a preferred example of an agent of this type.

For certain applications, a further preferred component of the composition is a member of the alkyl sulfate class of wetting agents.

The zinc salts of dithiocarbamic acids that can be formulated according the present invention include the zinc N,N-dialkyldithiocarbamates, for example N,N-dimethyldithiocarbamate, zinc N,N-diethyldithiocarbamate, and zinc N,N-di-n-butyldithiocarbamate. Also included are the zinc salts of N-substituted dithiocarbamic acids in which the nitrogen atom forms part of a ring, for example zinc morpholinocarbodithioate and zinc piperidinocarbodithioate, zinc salts of N-alkyl, N-aryldithiocarbamic acids, for example zinc N-ethyl - N - phenyldithiocarbamate, and zinc salts of dithiocarbamic acids containing more than one dithiocarbamate group, for example zinc ethylenebis (dithiocarbamate).

Where the formulation contains a zinc salt of a mercaptobenzothiazole, the mercaptobenzothiazole is usually 2-mercaptobenzothiazole, although it can be for example a nuclear substituted 2-mercaptobenzothiazole.

The amine salts of sulfated fatty esters used in the compositions of the invention are generally those derived from unsaturated fatty acids containing from 12 to 24 carbon atoms, for example 9-hexadecenoic acid, oleic acid, 11-octadecenoic acid, 9-eicosenoic acid, 11-docosenoic acid, or erucic acid. The esterifying radical is usually one containing from 1 to 8 carbon atoms, especially an alkyl radical containing from 2 to 6 carbon atoms, for instance a propyl, butyl, or hexyl radical. The amine salts of sulfated esters of oleic acid are particularly suitable.

The amines from which such amine salts are derived are in general primary, secondary, or tertiary aliphatic amines. These amines include the alkyl, dialkyl, and trialkylamines, and of such compounds, those where each alkyl group contain not more than four carbon atoms and the total number of carbon atoms in the amine molecule is from 2 to 9, are preferred. Examples of such amines are ethylamine, triethylamine, isopropylamine, and diisopropylamine. A more preferred sub-class of aliphatic amines, however, are the hydroxyalkylamines and hydroxy (alkyleneoxy) amines where at least one of the groups attached to the nitrogen atom in the amine molecule has the formula —$(C_nH_{2n}O)_xH$ in which the value of $n$ is 2, 3, or 4, and the value of $x$ is from 1 to 10. The lowest members of this series of amines are the ethanolamines where $n$ has the value 2 and $x$ has the value 1. These include monoethanolamine, diethanolamine, and triethanolamine; the diethanolamine salts of sulfated fatty acid esters, for example the diethanolamine salt of sulfated butyl oleate, are particularly satisfactory for use in the compositions of the invention. Other examples of amines of this class are the isopropanolamines, isobutanolamines and [($\beta$-hydroxyethyl)oxyethyl] amines.

The commercially available amine salts of sulfated fatty acid esters are often mixtures of different amine salts or mixtures of the amine salt or salts with carriers or extenders; they may, for example, contain a proportion of unsulfonated fatty acid ester. Such commercial materials are, however, quite suitable for use in compositions of the invention.

The amount of the amine salt in a composition of the invention can be for example from 0.25 to 5.0% and is preferably from 0.25 to 2.0%, for instance from 0.5 to 1.0% of the weight of the zinc salt. Where the commercially available wetting agent contains the active material in admixture with other ingredients, the amount used is selected to give an appropriate content of active material in the composition.

Finely-divided, absorbent, water-insoluble solids that can be used in compositions of the invention include, in addition to the calcium and magnesium silicates referred to above, such materials as kieselguhr and silica. The state of sub-division of the absorbent solid should be comparable with that of the zinc salt, which in turn is that conventionally required for a solid that is intended for dispersion in rubber. Typically, less that 1% should be retained on a 200 British Standard Sieve mesh, and less 50% on a 300 B.S.S. mesh. Where a finely-divided, absorbent, water-insoluble solid is present in the composition, the amount can, for example, be from 0.25 to 3% and preferably from 0.5 to 2.5% of the weight of the zinc salt.

Where the composition includes a suspension stabilizing agent, this can be for example a water soluble polyelectrolyte such as for instance an alkali metal salt of a carboxyalkyl cellulose, or an alkali metal salt of a polyacrylic acid or partially hydrolyzed polyacrylate ester or polyacrylonitrile. Other suitable water soluble materials include polyvinyl alcohol, methyl cellulose, gelatin, and polyvinyl pyrrolidone. Water insoluble materials that function as suspension stabilizing agents include certain clays such as, for instance, bentonite clay.

The quantity of a suspension stabilizing agent in a composition depends on the nature of the agent, but is usually from 0.25 to 3% of the weight of the zinc salt. Using sodium carboxymethyl cellulose, for example, from 0.3 to 1.3% of the weight of the zinc salt is generally suitable, while for the bentonite clays, an amount of from 1 to 3% of the weight of the zinc salt is usually preferred.

As indicted above, a composition of the invention may also contain an alkyl sulfate wetting agent. These materials are generally the alkali metal, ammonium, or amine salts of secondary alkyl sulfuric acids derived by the sulfating or olefins or olefin mixtures wherein the olefin molecule contains, for instance, from 8 to 12 carbon atoms. Where an alkyl sulfate is incorporated in a composition of the invention, the amount employed is usually not more than 50% of the weight of the amine salt of the sulfated fatty acid ester.

A composition of the invention is readily produced in conventional mixing equipment. If desired, the mixture can be subjected to a milling or sieving operation after blending.

The invention is illustrated by the following example.

EXAMPLE

Blends having the composition shown in the following table (quantities in pounds) were produced by mixing those of the components that were dry powders for 30 minutes and then spraying on to the agitated mixture the diethanolamine salt composition, followed, in the case of the blend containing zinc 2-mercaptobenzothiazole, by the secondary alkyl sulfate solution. Mixing was then continued for a further 1½ hours.

| Components | Blends | | | |
|---|---|---|---|---|
| | 1 | 2 | 3 | 4 |
| Zinc 2-mercaptobenzothiazole | 100 | | | |
| Zinc N,N-dimethyldithiocarbamate | | 100 | | |
| Zinc N,N-diethyldithiocarbamate | | | 100 | |
| Zinc N,N-dibutyldithiocarbamate | | | | 100 |
| Bentonite clay (99.4% passing 300 B.S.S. mesh on wet sieve analysis) | 2 | 2 | 2 | 2 |
| Calcium silicate (99.98% passing 200 B.S.S. mesh on Alpine air jet sieve analysis) | 2 | | | 2 |
| Partially hydrated magnesium silicate [Sepiolite (≈100)] | | 2 | 2 | |
| Diethanolamine salt of sulfated monobutyl oleate. (Approx. 40% by weight active content) | 2 | 2 | 2 | 2 |
| 25% aqueous solution of a sodium secondary alkyl sulfate ($C_8$–$C_{10}$) | 1 | | | |

Each blend dispersed easily and uniformly when added to stirred water. A suspension of 50 grams of the blend containing zinc N,N-diethyldithiocarbamate in 50 cc. of water had an average rate of sedimenation during 17 hours of 7% by volume, and a suspension of the blend containing zinc 2-mercaptobenzothiazole having the same concentration had an average rate of sedimentation during 17 hours of 4% by volume.

Spraying the salt of sulfated fatty acid ester onto the surface of the powder to be rendered dispersible, preferably while the powder is being mixed or tumbled, constitutes an advantageous method of incorporation. The amine salts of sulfated fatty acid esters maintain the spray nozzles free of obstruction and avoid blocking them.

What is claimed is:
1. A water dispersible composition consisting essentially of an accelerator of vulcanization or rubber stabilizer selected from the group consisting of zinc N,N-di(lower alkyl) dithiocarbamate, zinc morpholinocarbodithioate, zinc piperidinocarbodithioate, zinc N-lower alkyl-N-aryldithiocarbamate, zinc ethylenebis (dithiocarbamate), and zinc 2-mercaptobenzothiazole and 0.25% to 5% by weight of an amine salt of an ester of sulfated unsaturated fatty acid wherein the esterifying radical is alkyl of 1–8 carbon atoms, the acid contains 12–24 carbon atoms, and the amine is selected from the group consisting of alkyl, dialkyl and trialkyl amines in which each alkyl group contains not more than four carbon atoms, alkanol amines where at least one of the groups attached to the nitrogen in the amine molecule has the formula —$(C_nH_{2n}O)_xH$ where $n$ is 2, 3 or 4 and $x$ is 1 to 10 and mixtures of the aforesaid amines.

2. A composition according to claim 1 in which the zinc salt is a zinc salt of an N,N-d, (lower alkyl)di thiocarbamic acid.

3. A composition according to claim 2 in which the zinc salt is selected from a group consisting of zinc N,N-dimethyldithiocarbamate, zince N,N - diethyldithiocarbamate, and zinc N,N-di-n-butyldithiocarbamate.

4. A composition according to claim 1 in which the zinc salt is the zinc salt of 2-mercaptobenzothiazole.

5. A composition according to claim 1 in which the amine of the amine salt is an alkanol amine where at least one of the groups attached to the nitrogen atom in the amine molecule has the formula —$(C_nH_{2n}O)_xH$ in which the value of $n$ is 2, 3, or 4, and the value of $x$ is from 1 to 10.

6. A composition according to claim 5 in which the amine of the amine salt is an ethanolamine.

7. A composition according to claim 1 in which the esterifying radical in the amine salt is an alkyl radical containing from 2 to 6 carbon atoms.

8. A composition according to claim 7 in which the amine salt is the diethanolamine salt of sulfated butyl oleate.

9. A composition according to claim 1 having as a further component in amount to inhibit caking within the range of 0.25% to 3% by weight of the zinc salt of a finely divided water insoluble absorbent solid selected from the group consisting of calcium silicate, magnesium silicate, kieselguhr and silica.

10. A composition according to claim 9 in which the finely-divided, water-insoluble, absorbent solid is selected from a group consisting of calcium silicate and magnesium silicate.

11. A composition according to claim 10 in which the amount of the finely-divided, water insoluble, absorbent solid is 0.5 to 2.5% of the weight of the zinc salt.

12. A composition according to claim 1 having in suspension stabilizing amount within the range of 0.25% to 3% by weight of the zinc salt of a suspension stabilizing agent selected from the group consisting of water soluble from the group consisting of alkali metal carboxymethyl cellulose, alkali metal polyacrylic acid, partially hydrolyzed polyacrylic acid, polyacrylonitrile, polyvinyl alcohol, methyl cellulose, gelating polyvinylpyrrolidone, and bentonite.

13. A composition according to claim 12 in which the suspension stabilizing agent is bentonite clay.

14. The process which comprises spraying an amine salt of an ester of sulfated unsaturated fatty acid wherein the esterifying radical is alkyl of 1–8 carbon atoms, the acid contains 12–24 carbon atoms and the amine is selected from the group consisting of alkyl, dialkyl and trialkyl amines in which each alkyl group contains not more than four carbon atoms, alkanol amines where at least one of the groups attached to the nitrogen in the amine molecule has the formula —$(C_nH_{2n}O)_xH$ where $n$ is 2, 3, or 4 and $x$ is 1 to 10 and mixtures of the aforesaid amines, onto an accelerator of vulcanization or rubber stabilizer selected from the group consisting of zinc N,N-di(lower alkyl) dithiocarbamate, zinc morpholinocarbodithioate, zinc piperidinocarbodithioate, zinc N-lower alkyl-N-aryldithiocarbamate, zinc 2-mercaptobenzothiazole, the quantity of amine salt being within the range of 0.25% to 5% by weight of the zinc salt and sufficient to provide a water dispersible composition.

15. A composition according to claim 1, having as a further component but not more than 50% of the weight of the amine salt of the sulfated fatty acid ester a member of the group consisting of alkali metal, ammonium and amine salts of secondary alkyl sulfuric acids containing 8–12 carbon atoms.

References Cited

UNITED STATES PATENTS

| | | | |
|---|---|---|---|
| 2,805,996 | 9/1957 | Deger | 260—793 |
| 2,977,344 | 3/1961 | Powers et al. | 260—79.5 |
| 2,992,202 | 7/1961 | Lemiszka et al. | 260—785 |
| 3,023,195 | 2/1962 | Martin et al. | 260—793 |
| 3,145,179 | 8/1964 | Mitoray et al. | 252—402 |
| 3,288,741 | 11/1966 | Chang | 260—29.7 |
| 3,400,106 | 9/1968 | Morita | 260—785 |

MAYER WEINBLATT, Primary Examiner

I. GLUCK, Assistant Examiner

U.S. Cl. X.R.

252—400, 402, 406, 405; 260—45.75, 814, 795, 793, 796

PO-1050
(5/69)

UNITED STATES PATENT OFFICE
CERTIFICATE OF CORRECTION

Patent No. 3,525,697                    Dated August 25, 1970

Inventor(s) Eric Rogers

It is certified that error appears in the above-identified patent and that said Letters Patent are hereby corrected as shown below:

Column 1, line 5, "Chemical" should read "Chemicals"; Column 1, line 9, "12,088/66" should read "17,088/66".

Column 4, line 24 of the printed patent which is the third line of claim 3, "zince" should read "zinc"; column 4, line 60 which is the fifth line of claim 12, delete "from the group consisting of"; column 4, line 63 which is next to the last line of claim 12, "gelating" should read "gelatin,".

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents